INVENTORS
HARRY W. FAEBER
ORVILLE V. DUTRO
LYLE DUTRO
BY
their ATTORNEYS

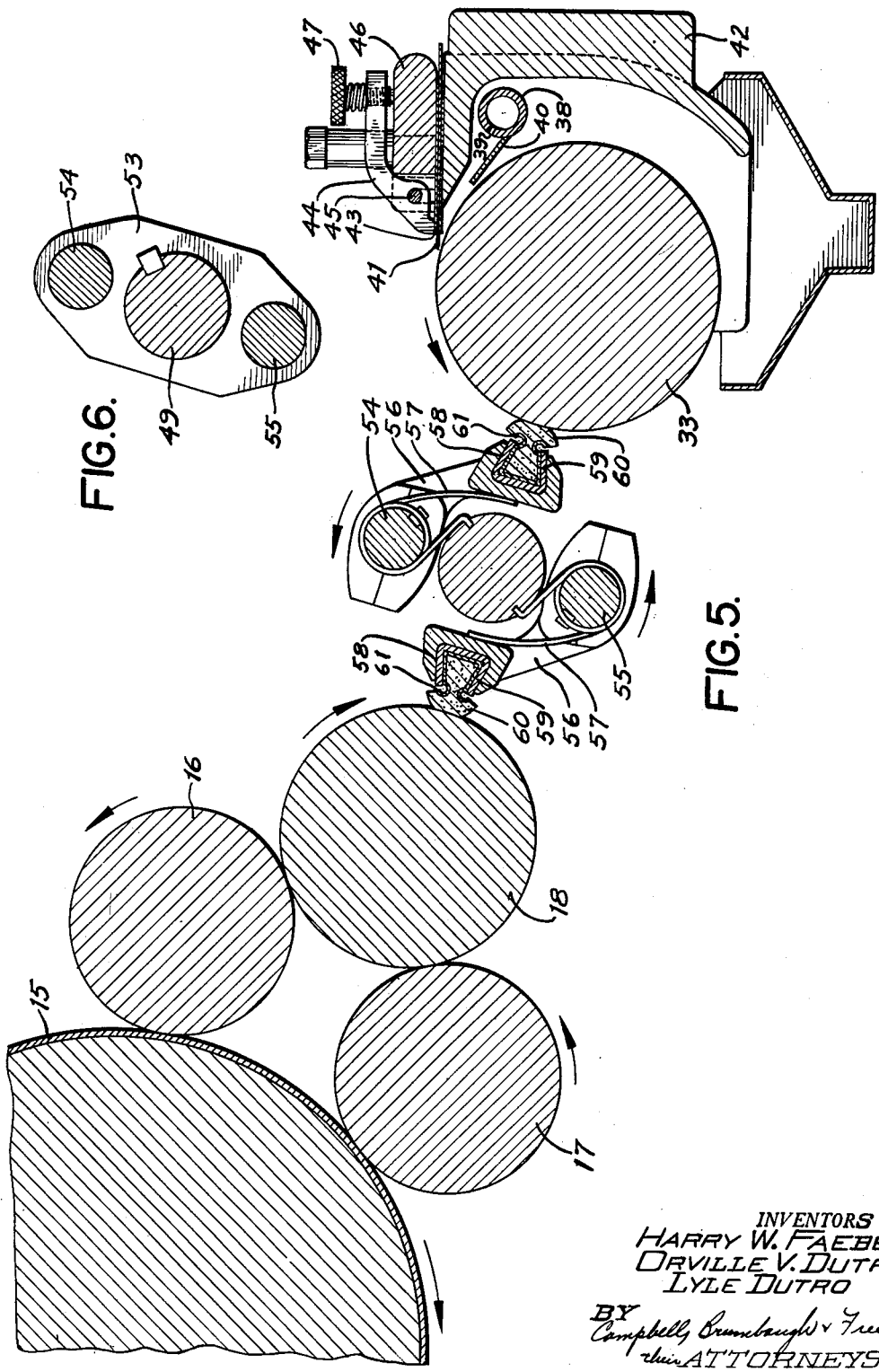

Jan. 1, 1952 H. W. FAEBER ET AL 2,580,667
WATER MOTION FOR OFFSET PRESSES
Filed Oct. 21, 1947 6 Sheets-Sheet 5

INVENTORS
HARRY W. FAEBER
ORVILLE V. DUTRO
LYLE DUTRO
BY
Campbell Brumbaugh & Free
their ATTORNEYS Jan. 1, 1952  H. W. FAEBER ET AL  2,580,667
WATER MOTION FOR OFFSET PRESSES
Filed Oct. 21, 1947  6 Sheets-Sheet 6

INVENTORS
HARRY W. FAEBER
ORVILLE V. DUTRO
LYLE DUTRO
BY
their ATTORNEYS

Patented Jan. 1, 1952

2,580,667

UNITED STATES PATENT OFFICE 2,580,667

WATER MOTION FOR OFFSET PRESSES

Harry W. Faeber, Larchmont, N. Y., and Orville Dutro and Lyle V. Dutro, La Canada, Calif., assignors to Time, Inc., New York, N. Y., a corporation of New York Application October 21, 1947, Serial No. 781,120

6 Claims. (Cl. 101—148)

The present invention relates to water (or other liquid) mechanisms for offset printing presses and embodies, more specifically, an improved mechanism by means of which the amount of water or other liquid furnished to the form cylinder of an offset printing press may be accurately controlled. As used herein, the term "water" will be understood to include other liquids such as ink.

It will be readily understood by those skilled in the art that offset and similar types of printing presses may require the furnishing of water to the surface which is to be inked and from which surface the inked design is removed and offset onto the web or sheet of paper to be printed. Existing mechanisms for accomplishing this operation have certain objectionable characteristics, the chief one of which is the difficulty of furnishing an accurately controlled amount of water to the form cylinder. Without proper control of the amount of water applied to the form cylinder, there results an impairment of the quality of the printed product.

An object of the present invention, accordingly, is to provide a mechanism by means of which water may be applied to the ink receiving surface of an offset or similar press in accurately controlled quantities.

A further object of the invention is to provide a water mechanism of the above character wherein accurate control of the water furnished to the form cylinder of an offset press is accomplished not only at the fountain roll, but also, in the transfer mechanism for transferring the water from the fountain roll to the distributing and applicator rolls.

Further objects of the present invention will be apparent as it is described in greater detail in connection with the accompanying drawings, wherein Figure 1 is a plan view of a portion of an offset or similar printing press showing water supplying mechanism of the present invention;

Figure 5 is a view in transverse section, taken on line 5—5 of Figure 1, and looking in the direction of the arrows;

Figure 6 is a detail view in section, taken on line 6—6 of Figure 1, and looking in the direction of the arrows, this view illustrating the supporting structure of the water transfer mechanism;

Figure 1:
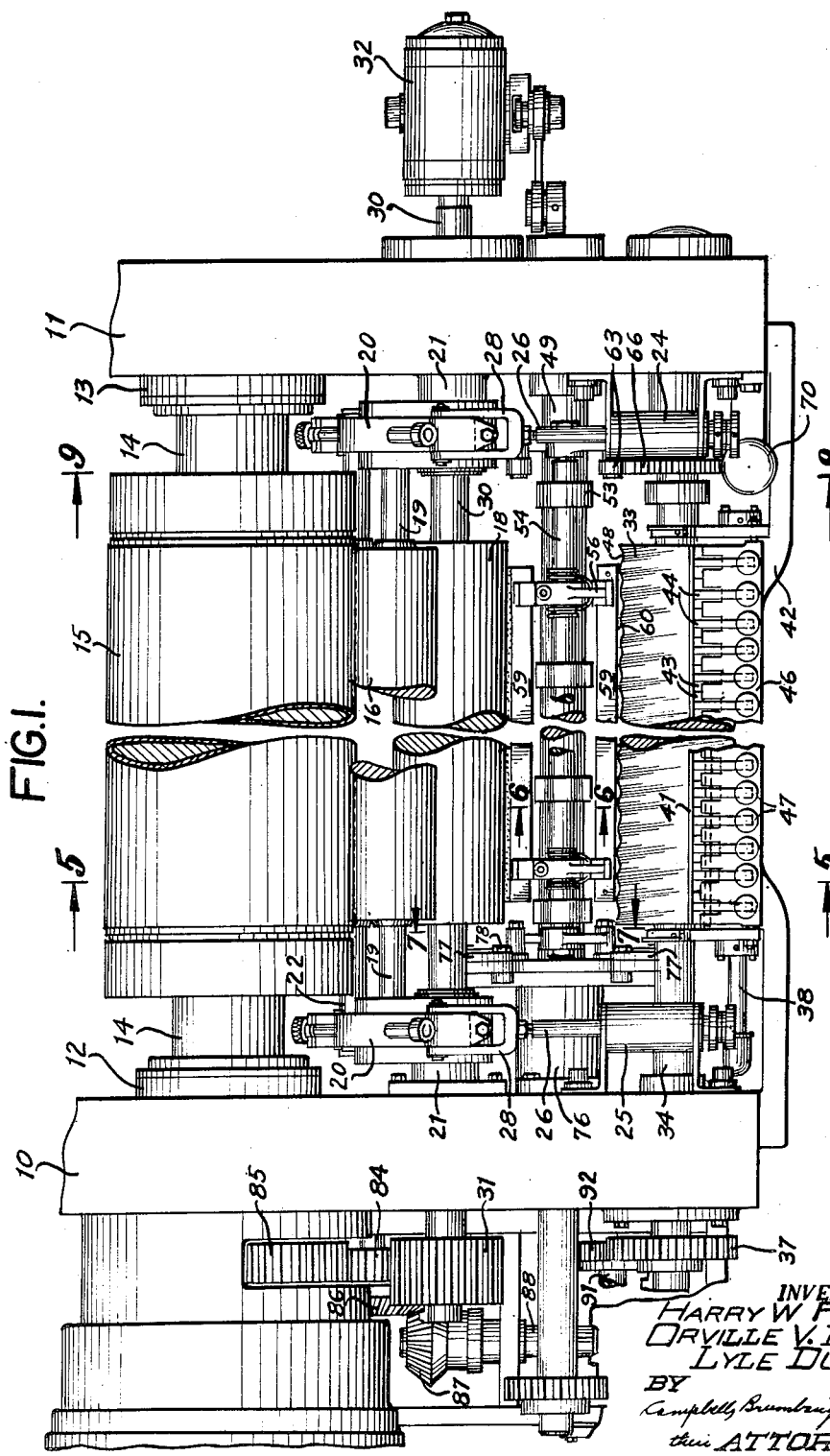

Referring to the above drawings, and particularly to Figure 1, the side frame members of a printing press are illustrated at 10 and 11. These frame members are provided, respectively, with bearings 12 and 13 in which the shaft 14 of a form cylinder 15 is journaled. The form cylinder is provided in a suitable fashion with a printing surface comprising ink receiving areas and areas that are not to be inked. As is well understood in this art, the printing operation requires that the form cylinder 15 must have applied thereto water which will be accepted by the areas that are not to receive ink and rejected by the ink receiving areas.

In order to accomplish the moistening of the surface of the plate cylinder 15, two applicator rolls 16 and 17 (Figure 5) are provided, the applicator rolls being supplied with water from a vibrator roll 18.

Applicator roll 16 is provided with a shaft 19 that is journaled in bushings 20 (Figures 3 and 4), bushings 20 being pivotally mounted upon bearing sleeves 21.

Figure 3:
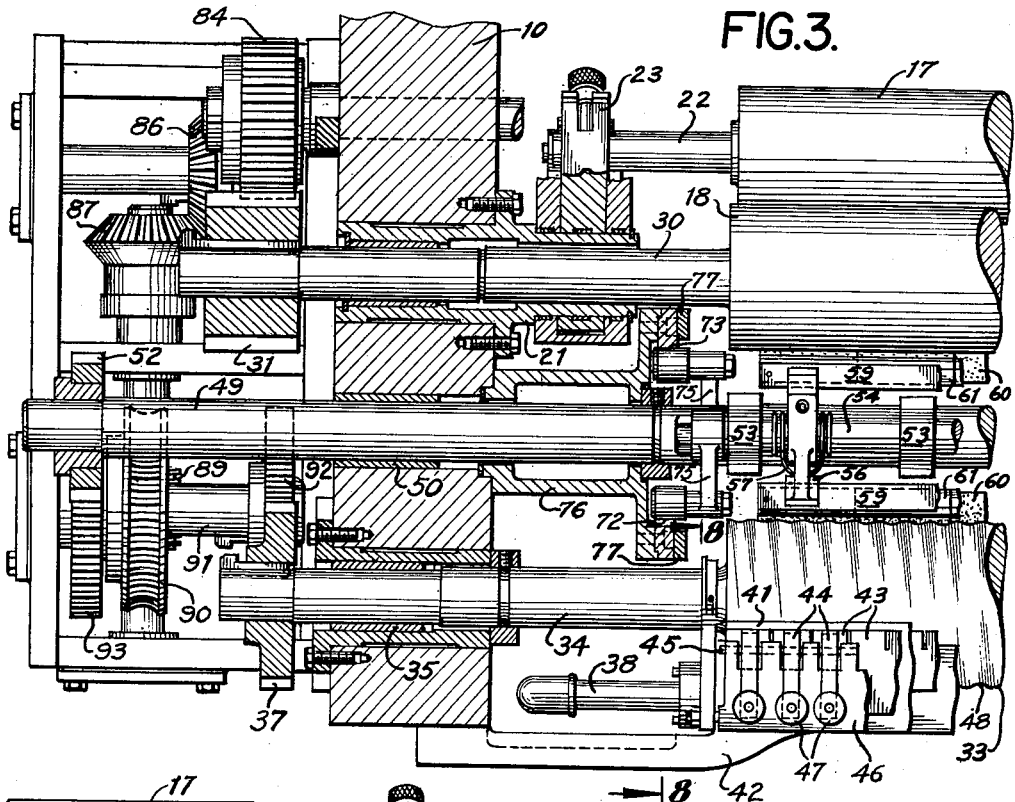
Figure 3 is a plan view in section, taken on line 3—3 of Figure 2, and looking in the direction of the arrows, and showing the left-hand end of the mechanism of Figure 7.
Figure 4:
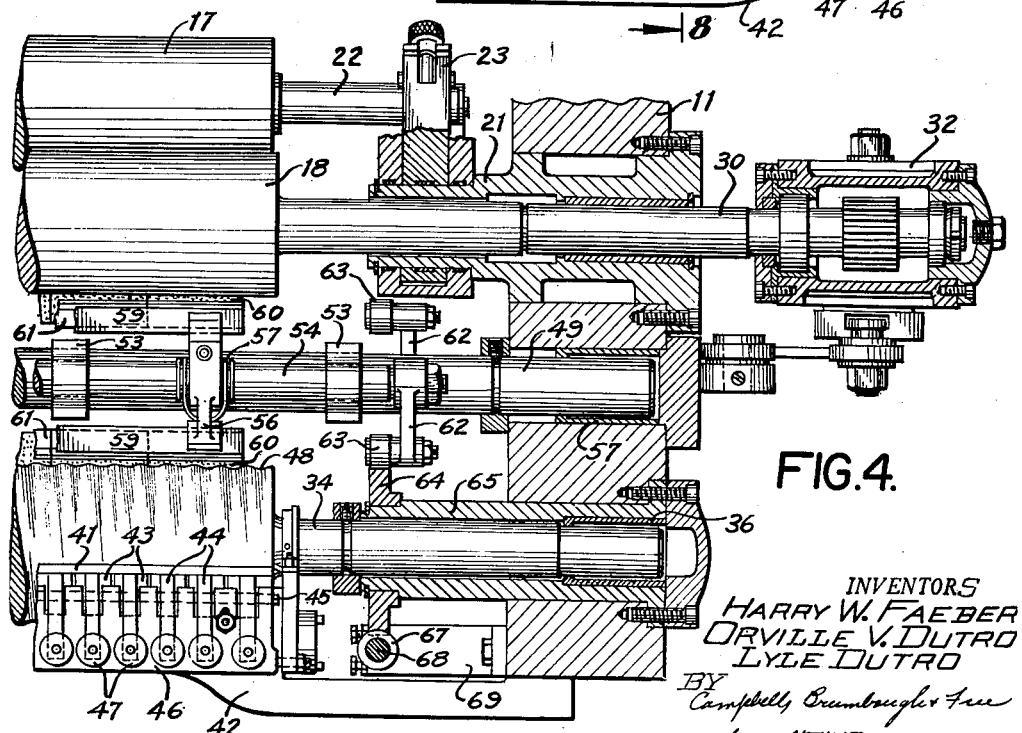
Figure 4 is a view similar to Figure 3 showing the right-hand end of the mechanism of Figure 1.
Figure 9:
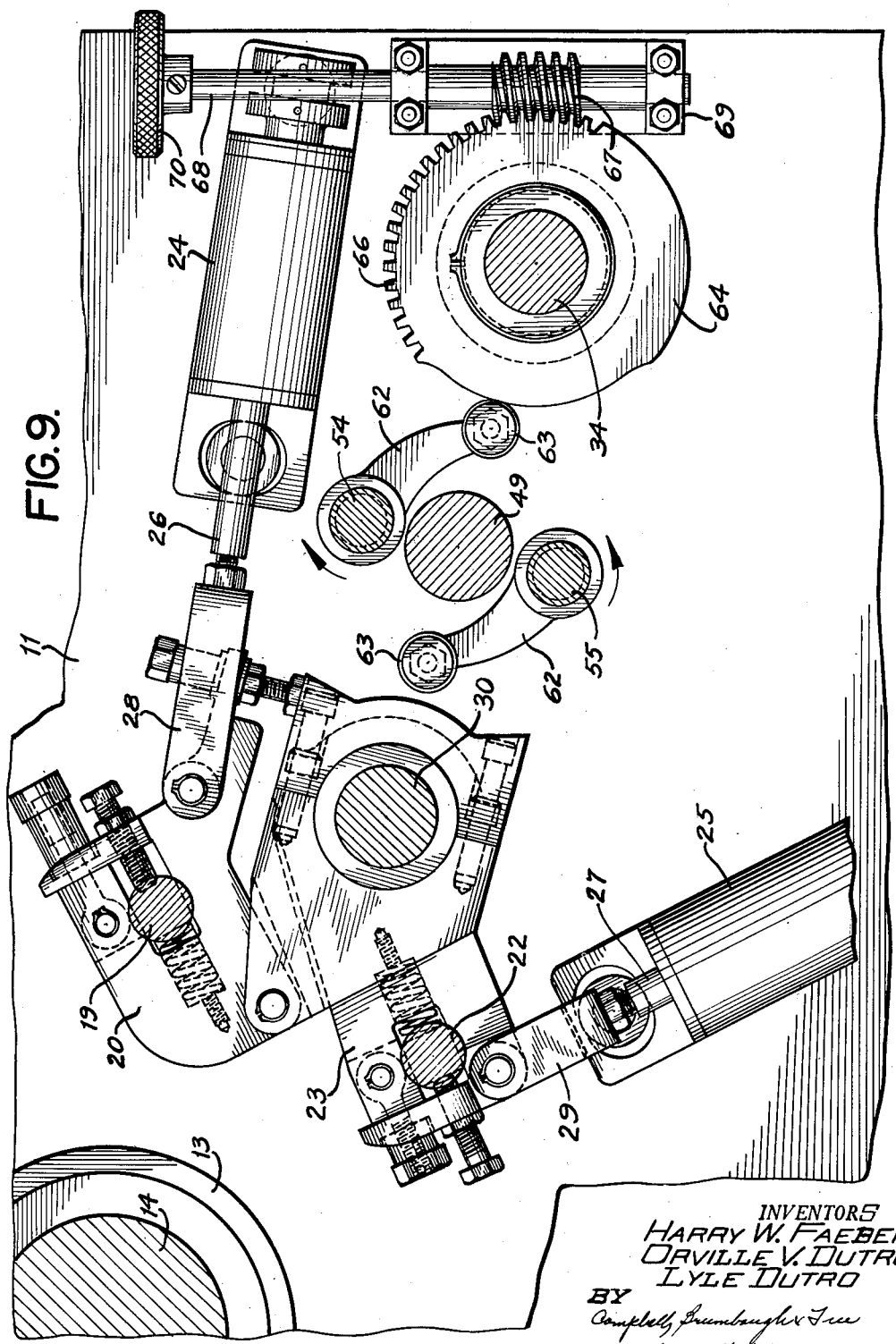
Figure 9 is a view in section, taken on line 9—9 of Figure 1, and looking in the direction of the arrows, this view illustrating the additional control mechanism for the water transfer device.

Applicator roll 17 is provided with a shaft 22 that is journaled in bushings 23, also pivotally mounted upon the bearing sleeve 21 (Figures 3, 4, and 9).

Movement of the applicator rolls 16 and 17 into the operating position shown in Figure 5 is controlled by means of hydraulic cylinders 24 and 25 (Figure 9) that are provided with piston rods 26 and 27, respectively, carrying forked extensions 28 and 29 that are pivoted to the respective bushings 20 and 23. Appropriate fluid pressure within the cylinders 24 and 25 thus serves to move the applicator rolls 16 and 17 into and out of operating engagement with the form cylinder 15. In this fashion, when the printing operation is interrupted, suitable control mechanism introduces fluid into the cylinders 24 and 25 to retract the applicator rolls 16 and 17 from engagement with the form cylinder 15 and thus prevents overloading of the form cylinder with water.

The vibrator roller 18 is provided with a shaft 30 that is journaled in the bearing sleeves 21, the left-hand end of shaft 30, as viewed in Figure 1, extending beyond the side frame member 10, and being provided with a drive gear 31 which is driven from suitable gearing on the drive side of the press, the details of which form no part of the present invention.

The right-hand extremity of shaft 30 extends beyond the press frame 11 and is provided with a reciprocating mechanism 32 which is adapted to reciprocate the vibrator roller 18 continuously during rotation thereof. The details of this reciprocating mechanism form no part of this invention and need not be described herein.

The mechanism to supply water to the vibrator roll 18 comprises a fountain, fountain roll, and transfer apparatus illustrated in detail in Figure 5 and also shown in Figures 1, 3, and 4.

Referring to Figure 5, the fountain roll is shown at 33, this roll being provided with a shaft 34 (Figures 3 and 4) which is journaled in the side frames 10 and 11 by bearings 35 and 36, respectively. The shaft 34 is provided with a gear 37 and the surface of the roll is moistened by means of a water pipe 38 having a slot or plurality of apertures 39 which discharge water onto a wier blade 40 that terminates closely adjacent the roll 33. Water thus is distributed over the length of the roll 33 and is carried by the roll in a counterclockwise direction, as viewed in Figure 5. In order that the film of water on the roll 33 may be evenly distributed, a doctor blade 41 is provided, the doctor blade being mounted upon the supporting frame 42 and its position with respect to the surface of the fountain roll 33 controlled by means of a plurality of pressure blades 43, each of which is controlled by a pressure arm 44, pivoted upon a shaft 45. The shaft 45 is mounted upon a plate 46 and a plurality of adjustment screws 47 are provided for the respective arms 44, as illustrated in Figure 5. In accordance with the present invention, the surface of the roll 33 is formed with a spiral groove 48 in order that the quantity of water carried over by the fountain roll 33 may be effectively controlled by the doctor blade 41.

The water is transferred from the fountain roll 33 to the vibrator roll 18 by means of a transfer mechanism illustrated in Figures 1, 3, 4, 5, and 6. This mechanism comprises a shaft 49 journaled in side frame members 10 and 11 by bearings 50 and 51. Shaft 49 extends beyond the side frame member 10 and is provided with an elliptical driving gear 52. Upon the shaft 49 a plurality of spiders 53 is secured, these spiders carrying rock shafts 54 and 55 at the extremities thereof. Each rock shaft is provided with a plurality of supporting arms 56 which are keyed thereto and which are normally urged outwardly by means of springs 57. Each of the arms 56 is formed with a dove-tailed slot 58 in which the transverse track 59 is received. Slidably mounted in the track 59 is a plurality of sponge segments 60, the segments being carried in clips 61 that are adapted to be slidably mounted in the tracks 59. The sponge and clip segments 60 and 61 are thus slid into the tracks and positioned therein in contiguous continuity, as illustrated in Figures 3 and 4. At the right-hand extremities of each of the shafts 54 and 55 there is mounted an operating arm 62 (Figure 9), the extremities of the arms 62 being provided with cam rollers 63 adapted to engage a dwell cam 64 (Figure 9). The dwell cam is journaled upon a sleeve 65 and is provided with peripheral teeth 66 that are engaged by a worm 67 formed upon a control shaft 68. Control shaft 68 is journaled in a bracket 69 carried upon the side frame member 11 and is provided with an operating knob 70 in order that the position of the cam 64 may be adjusted. Cam 64 thus controls the period of time during which the sponges 60 engage the fountain roll 33 in their rotation about the shaft 49.

Figures 7, 8:
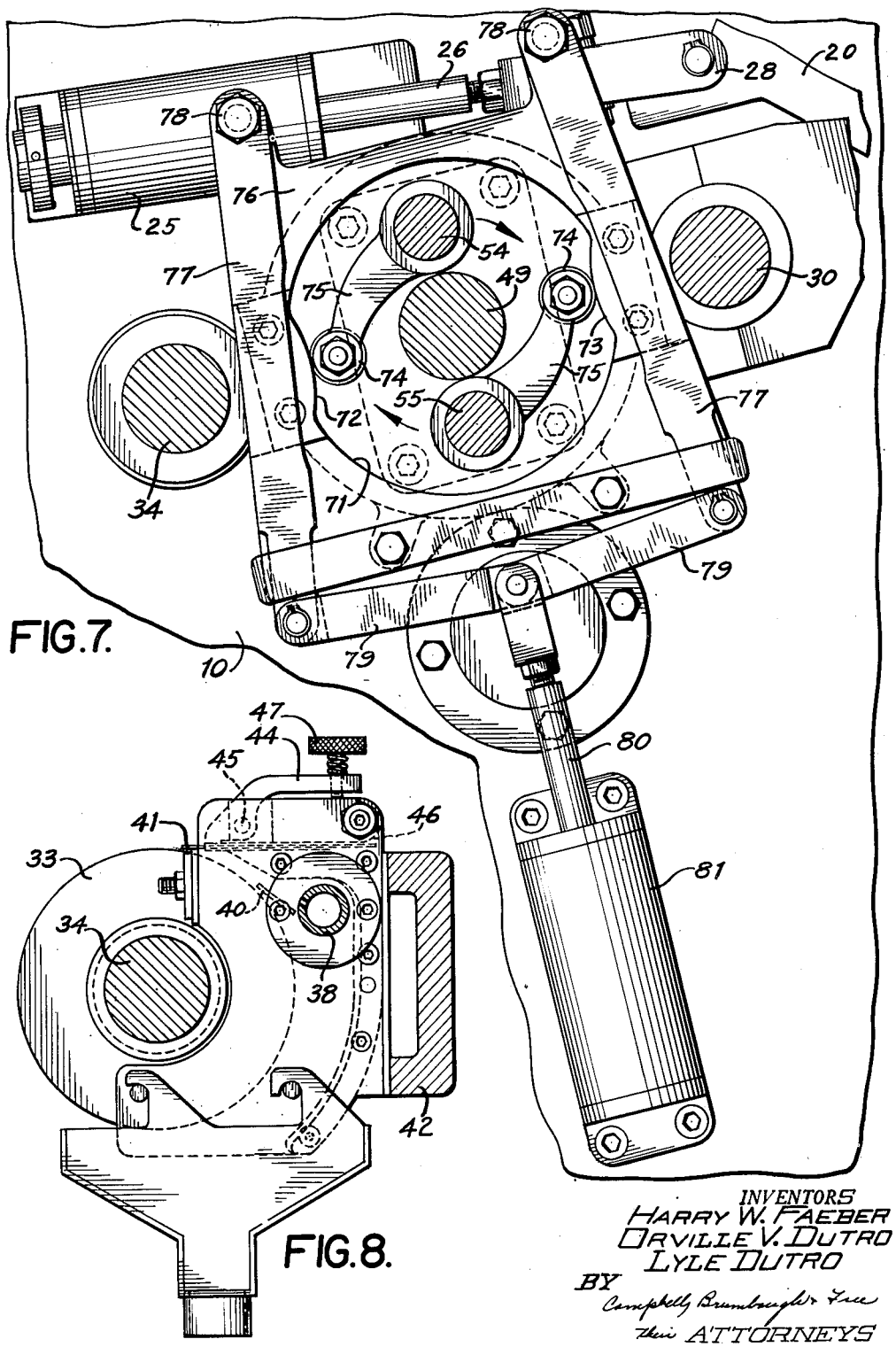
Figure 7 is a view in partial section, taken on line 7—7 of Figure 1, and looking in the direction of the arrows, this view illustrating the mechanism for controlling the operation of the water transfer mechanism.
Figure 8 is a detail view in section, taken on the broken line 8—8 of Figure 3, and looking in the direction of the arrows.

As illustrated in Figures 3 and 7, the operation of the water transfer mechanism is also controlled by an internal cam track 71 having oppositely spaced cams 72 and 73 against which cam rollers 74 engage, the cam rollers being journaled upon the extremities of arms 75 secured to the left-hand ends of rock shafts 54 and 55, as viewed in Figure 3. The cams 72 and 73 have the same contour as the dwell control cam 64 and are provided in order to prevent undue crushing of the sponge members 60. The cam elements 71, 72, and 73 are mounted upon a sleeve 76 carried upon the side frame member 10 concentric with the shaft 49, as illustrated in Figure 3.

In order that the sponge segments may be retracted from their operative position to contact the fountain roll 33 and the vibrator roll 18, a grasshopper cam mechanism is provided comprising arms 77 journaled upon the sleeve supporting element 76 at 78. The lower ends of the arms 77 are pivotally connected to links 79 which are pivotally connected to a piston rod 80 received within a cylinder 81 (Figure 7). Fluid within cylinder 81 may be supplied in suitable fashion to move the piston rod 80 downwardly as viewed in Figure 7 and thus bring the arms 77 together to engage the cam rollers 74. This action moves the cam rollers 74 toward the axis of shaft 49 and thus moves the sponge segments correspondingly to prevent their contact with the fountain roll 33 and vibrator roll 18.

Figure 2:
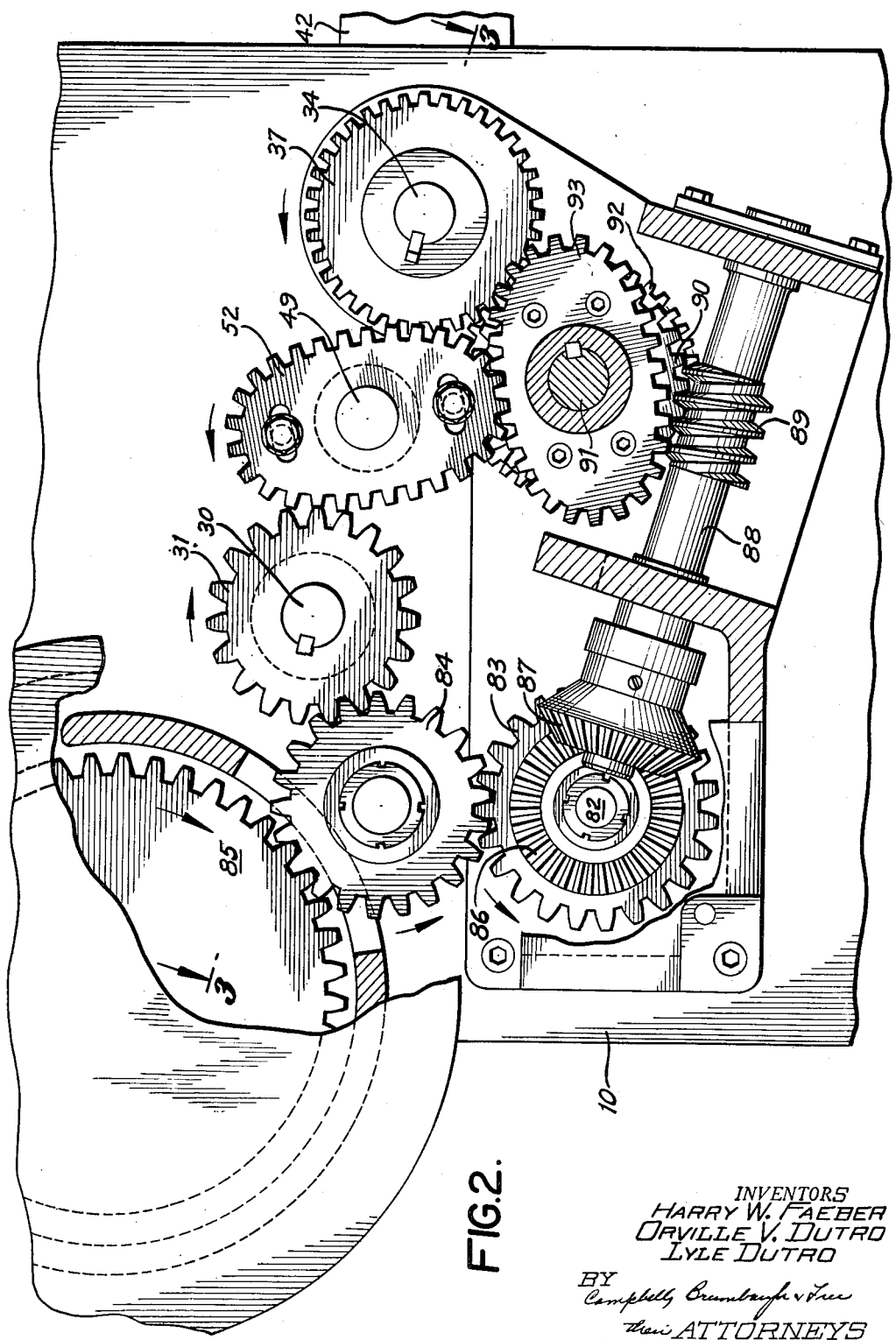
Figure 2 is a partial view in end elevation, looking from the left in Figure 1, portions of the mechanism being broken away and in section.

The plate cylinder, vibrator roll, transfer mechanism and fountain roll are actuated by drive mechanism, as illustrated in Figure 2. A power supply shaft 82 carried by the press frame and suitably driven is provided with a drive gear 83 which engages an intermediate drive gear 84 engaging a gear 85 carried by the plate cylinder shaft. Intermediate gear 84 also engages gear 31 on the vibrator roll shaft 30 to rotate the same during operation of the press. The shaft 82 is also provided with a bevel drive gear 86 which drives a mating bevel gear 87 secured to a drive shaft 88 which is suitably journaled upon the side frame member 10. Drive shaft 88 is formed with a worm 89 (Figures 2 and 3) that engages a worm wheel 90 secured to a lay shaft 91. The lay shaft 91 is provided with a drive gear 92 that engages the drive gear 37 on the fountain roll shaft 34. The lay shaft 91 is also provided with an elliptical gear 93 that engages the elliptical gear 52 on the shaft 49, as previously described. In this fashion, the power supply shaft 82 serves to drive the plate cylinder 50, vibrator roll 18, transfer mechanism on shaft 49, and the fountain roll 33.

In the operation of the mechanism above described, water furnished to the fountain roll 33 is properly metered and transferred from the fountain roll by the sponge segments 60 of the transfer mechanism. As previously noted, the operation of the sponge sections is accurately controlled by the cam mechanism above described, and thus the water taken by them from the fountain roll 33 is transferred to the vibrator roll 18 and, from the vibrator roll 18, through the applicator rolls 16 aand 17 to the plate cylinder 15. The contour of the fountain roll 33, together with the mechanism for controlling the doctor 41, provides an effective means for controlling the quantity and distribution of the water on the surface of the roll 33. The transfer mechanism, comprising the sponge segment 60 and operating mechanism therefor, further provides effective means for controlling the transfer of the water to the distributing system, the transfer mechanism being of such character as to greatly facilitate the insertion and renewal of the sponge segments without disturbing the other elements of the press mechanism. In this fashion, the control of the moisture supplied to the plate cylinder is effectively accomplished. The dwell control cam, as well as the grasshopper and internal cam structure, provide an effective means for not only controlling the water transfer mechanism during normal operation of the press, but also enable that mechanism to be rendered ineffective during periods when the press is not printing. Moreover, as will be readily understood from the foregoing description, the mechanism for actuating the doctor 41 is such that the wiping edge of the doctor may be forced down into the spiral convolutions 48 to any desired extent, thus furnishing any desired quantity of water at any transverse point on the fountain roll 33.

While the invention has been described with specific reference to the structure shown in the accompanying drawings, it is not to be limited save as defined in the apperded claims.

We claim:

1. Means for transferring liquid between a fountain roller and a distributor roller parallel thereto which comprises a rotatable shaft between and parallel to said fountain roller and distributor roller, a spider on said shaft, a plurality of liquid transfer means on said spider for alternate contact with the peripheries of the fountain roller and the distributor roller, and means to alternately accelerate and decelerate the speed of rotation of the shaft to vary the speed with which the transfer means revolve about the axis of said shaft.

2. Means for transferring liquid between a fountain roller and a distributor roller parallel thereto which comprises a rotatable shaft between and parallel to said fountain roller and distributor roller, a spider on said shaft, a plurality of liquid transfer means on said spider for alternate contact with the peripheries of the fountain roller and the distributor roller, and means to rotate the shaft more rapidly during the travel of the transfer means between the fountain and distributor rollers than during contact thereof with said rollers.

3. Means for transferring liquid between a fountain roller and a distributor roller parallel thereto which comprises a rotatable shaft between and parallel to said fountain roller and distributor roller, a spider on said shaft, a plurality of rock shafts mounted for revolution about the rotatable shaft and for radial oscillation on the spider, and non-metallic, yielding liquid-receptive transfer means mounted eccentrically on said rock shafts for alternate contact with the peripheries of the fountain roller and distributor roller.

4. Means for transferring liquid between a fountain roller and a distributor roller parallel thereto which comprises a rotatable shaft between and parallel to said fountain roller and distributor roller, a spider on said shaft, a plurality of rock shafts mounted for revolution about the rotatable shaft and for radial oscillation on the spider, non-metallic, yielding liquid-receptive transfer means mounted eccentrically on said rock shafts for alternate contact with the peripheries of the fountain roller and distributor roller, and means to control the radial positions of the rock shafts on the spider.

5. Means for transferring liquid between a fountain roller and a distributor roller parallel thereto which comprises a rotatable shaft between and parallel to said fountain roller and distributor roller, a spider on said shaft, a plurality of rock shafts mounted for revolution about the rotatable shaft and for radial oscillation on the spider, non-metallic, yielding liquid-receptive transfer means mounted eccentrically on said rock shafts for alternate contact with the peripheries of the fountain roller and distributor roller, a plurality of spring clips adapted to receive and hold the respective transfer means releasably, and means to secure a plurality of the clips to each of the rock shafts.

6. Means for transferring liquid between a fountain roller and a distributor roller parallel thereto which comprises a rotatable shaft between and parallel to said fountain roller and distributor roller, a spider on said shaft, a plurality of rock shafts mounted for revolution about the rotatable shaft and for radial oscillation on the spider, non-metallic, yielding liquid-receptive transfer means mounted eccentrically on said rock shafts for alternate contact with the peripheries of the fountain roller and distributor roller, a plurality of spring clips adapted to receive and hold the respective transfer means releasably, means to secure a plurality of the clips to each of the rock shafts, and means to control the radial positions of the rock shafts on the spider.

HARRY W. FAEBER.
ORVILLE DUTRO.
LYLE V. DUTRO.

REFERENCES CITED

The following references are of record in the file of this patent:

UNITED STATES PATENTS

| Number | Name | Date |
|---|---|---|
| 441,790 | Cox | Dec. 2, 1890 |
| 472,666 | Cottrell | Apr. 12, 1892 |
| 1,185,669 | Hoe | June 6, 1916 |
| 1,262,709 | Smith | Apr. 16, 1918 |
| 1,514,991 | Rees | Nov. 11, 1924 |
| 1,558,686 | Lipton et al. | Oct. 27, 1925 |
| 1,683,243 | Blaine | Sept. 4, 1928 |
| 1,840,071 | Werner et al. | Jan. 5, 1932 |
| 1,995,701 | Buttner | Mar. 26, 1935 |
| 2,154,544 | Taylor | Apr. 18, 1939 |
| 2,162,248 | Delaplane | June 13, 1939 |
| 2,165,235 | Curtis | July 11, 1939 |

FOREIGN PATENTS

| Number | Country | Date |
|---|---|---|
| 69,668 | Norway | Sept. 2, 1943 |